(12) United States Patent
Nakamura et al.

(10) Patent No.: US 10,218,241 B2
(45) Date of Patent: Feb. 26, 2019

(54) MOTOR, AND ELECTRIC POWER STEERING APPARATUS AND VEHICLE EQUIPPED WITH THE SAME

(71) Applicant: NSK Ltd., Tokyo (JP)

(72) Inventors: Kozue Nakamura, Kanagawa (JP); Toshiaki Asada, Kanagawa (JP); Yusuke Kikuchi, Kanagawa (JP)

(73) Assignee: NSK LTD., Shinagawa-ku, Tokyo (JP)

( * ) Notice: Subject to any disclaimer, the term of this patent is extended or adjusted under 35 U.S.C. 154(b) by 0 days.

(21) Appl. No.: 15/323,231

(22) PCT Filed: Jun. 29, 2015

(86) PCT No.: PCT/JP2015/068613
§ 371 (c)(1),
(2) Date: Dec. 30, 2016

(87) PCT Pub. No.: WO2016/002687
PCT Pub. Date: Jan. 7, 2016

(65) Prior Publication Data
US 2017/0133905 A1    May 11, 2017

(30) Foreign Application Priority Data
Jun. 30, 2014 (JP) .................. 2014-133891

(51) Int. Cl.
*H02K 5/22* (2006.01)
*H02K 29/12* (2006.01)
(Continued)

(52) U.S. Cl.
CPC .......... *H02K 5/225* (2013.01); *B62D 5/0457* (2013.01); *H02K 3/522* (2013.01); *H02K 29/12* (2013.01);
(Continued)

(58) Field of Classification Search
CPC .......... H02K 5/04; H02K 5/0457; H02K 5/22; H02K 5/225; H02K 29/12; H02K 29/11; H02P 27/08; B62D 5/0457
(Continued)

(56) References Cited

U.S. PATENT DOCUMENTS

| | | | |
|---|---|---|---|
| 6,081,056 A * | 6/2000 | Takagi | H02K 5/08 310/216.137 |
| 7,675,206 B2 * | 3/2010 | Akutsu | H02K 5/22 310/112 |

(Continued)

FOREIGN PATENT DOCUMENTS

| CN | 102593976 A | 7/2012 |
|---|---|---|
| CN | 102782995 A | 11/2012 |

(Continued)

OTHER PUBLICATIONS

Masaki et al., Machine English Translation of H06-038444), 1994.*
(Continued)

*Primary Examiner* — Bernard Rojas
*Assistant Examiner* — Rashad Johnson
(74) *Attorney, Agent, or Firm* — Sughrue Mion, PLLC

(57) ABSTRACT

A motor having a configuration that includes plural openings which are disposed in a circumferential direction on a case bottom surface and are pulled-out bus bar terminals, and is directly connected between a control board and bus bars by using a simple procedure, and to an electric power steering apparatus and a vehicle equipped with the motor. The outer periphery of the motor is enclosed in a case and wirings are implemented at an anti-load side. The motor has a configuration that includes plural openings which are provided in a circumferential direction on a case bottom surface at the anti-load side and allow bus bar terminals to protrude therefrom, and openings which have an almost same shape
(Continued)

of the plural openings and are disposed at a predetermined interval in a similar shape are added as needed.

10 Claims, 8 Drawing Sheets

(51) Int. Cl.
    *B62D 5/04*                 (2006.01)
    *H02P 27/08*            (2006.01)
    *H02K 3/52*              (2006.01)
    *H02K 3/28*              (2006.01)

(52) U.S. Cl.
    CPC ............... *H02P 27/08* (2013.01); *H02K 3/28* (2013.01); *H02K 2203/09* (2013.01); *H02K 2213/12* (2013.01)

(58) Field of Classification Search
    USPC ............................... 310/68 B, 71, 88, 89, 91
    See application file for complete search history.

(56) References Cited

U.S. PATENT DOCUMENTS

| | | | | |
|---|---|---|---|---|
| 2009/0230805 A1* | 9/2009 | Ikeno | .................. | B62D 5/0403 310/195 |
| 2012/0169163 A1* | 7/2012 | Imai | .................... | H02K 1/2746 310/71 |
| 2012/0286593 A1 | 11/2012 | Yokogawa et al. | | |
| 2012/0319512 A1* | 12/2012 | Nakagawa | ............. | H02K 1/278 310/71 |
| 2013/0015748 A1* | 1/2013 | Takei | .................... | F16C 35/077 310/68 B |
| 2016/0294247 A1* | 10/2016 | Bauer | ...................... | H02K 5/04 |

FOREIGN PATENT DOCUMENTS

| | | |
|---|---|---|
| JP | 06-038444 A | 2/1994 |
| JP | 2008-079467 A | 4/2008 |
| JP | 2009-207270 A | 9/2009 |
| JP | 2010-263768 A | 11/2010 |
| JP | 2012-143089 A | 7/2012 |
| JP | 2013-090376 A | 5/2013 |
| JP | 2014-007784 A | 1/2014 |
| WO | 2013/065577 A1 | 5/2013 |
| WO | 2014/057978 A1 | 4/2014 |

OTHER PUBLICATIONS

International Search Report for application No. PCT/JP2015/068613 dated Oct. 6, 2015.
Written Opinion for application No. PCT/JP2015/068613 dated Oct. 6, 2015.
Notice of Allowance for application No. JP 2014-133891 dated Nov. 1, 2016.
Office Action for application No. JP 2014-133891 dated Jun. 21, 2016.

* cited by examiner

PRIOR ART

MOTOR, AND ELECTRIC POWER STEERING APPARATUS AND VEHICLE EQUIPPED WITH THE SAME

TECHNICAL FIELD

The present invention relates to a motor that has a configuration to include openings, which are provided at the same interval with a similar shape in a circumferential direction on a case bottom surface at an anti-load side of the motor and are pulled-out holes for bus bars, and to an electric power steering apparatus and a vehicle equipped with the above motor. The electric power steering apparatus which is equipped with the vehicle applies an assist force by the motor (for example, the brushless motor) to a steering system of the vehicle by means of a current command value calculated based on at least a steering torque, and is driving-controlled by the inverter which is constructed by a bridge circuit.

BACKGROUND ART

An electric power steering apparatus (EPS) serves as an apparatus which is equipped with a motor in a driving section. The electric power steering apparatus which provides a steering mechanism of a vehicle with an assist torque by means of a rotational torque of the motor, applies a driving force of the motor to be controlled with an electric power supplied from an inverter to a steering shaft or a rack shaft by means of a transmission mechanism such as gears. In order to accurately generate the assist torque, such a conventional electric power steering apparatus performs a feedback control of a motor current. The feedback control adjusts a voltage supplied to the motor so that a difference between a steering assist command value (a current command value) and a detected motor current value becomes small, and the adjustment of the voltage applied to the motor is generally performed by an adjustment of duty command values of a pulse width modulation (PWM) control. A brushless motor, which has excellent endurance and maintenance performances, and less undesired sound and noise, is generally used as the motor.

A general configuration of the conventional electric power steering apparatus will be described with reference to FIG. 1. As shown in FIG. 1, a column shaft (a steering shaft, a handle shaft) 2 connected to a steering wheel (handle) 1, is connected to steered wheels 8L and 8R through a reduction gear 3 in a reduction section, universal joints 4a and 4b, a rack and pinion mechanism 5, and tie rods 6a and 6b, further via hub units 7a and 7b. Further, the column shaft 2 are provided with a torque sensor 10 for detecting a steering torque Th and a steering angle sensor 14 for detecting a steering angle θ, and a motor 20 for assisting the steering force of the steering wheel 1 is connected to the column shaft 2 through the reduction gears 3. Electric power is supplied to a control unit (ECU) 30 for controlling the electric power steering apparatus from a battery 13, and an ignition key signal is inputted into the control unit 30 through an ignition key 11. The control unit 30 calculates a current command value of an assist command (steering assist) based on the steering torque Th detected by the torque sensor 10 and a vehicle speed Vel detected by a vehicle speed sensor 12, and controls a current supplied to the motor 20 for EPS based on a voltage control command value Vref obtained by performing compensation and so on with respect to the current command value.

As well, a steering angle sensor 14 is not indispensable and may not be provided. It is possible to obtain the steering angle sensor θ from a rotational position sensor such as a resolver connected to the motor 20.

A controller area network (CAN) to send/receive various information and signals on the vehicle is connected to the control unit 30, and it is also possible to receive the vehicle speed Vel from the CAN 40. Further, a non-CAN 41 is also possible to connect to the control unit 30, and the non-CAN 41 sends and receives a communication, analogue/digital signals, electric wave or the like except for the CAN 40.

FIG. 2 shows a power transmitting mechanism example of the motor 20 of the electric power steering apparatus and a connection example of the motor 20 and the control unit (ECU) 30.

As shown in FIG. 2, an output shaft 21 of the motor 20 is extended to an exterior of a motor housing 22, and the motor housing 22 to form a motor yoke includes a case body 23, which has an almost cylindrical configuration with a bottom surface and receives the motor body having a rotor and the like, and a motor attaching section 24 attached to an opening side of the case body 23. The motor attaching section 24 is in a disk form as an overall, and protrudes the output shaft 21 exterior to the motor attaching section 24 via a through hole in the center portion. The motor attaching section 24 may be in a flange form.

A power transmitting mechanism 50 coupled to the motor 20 includes a worm reduction mechanism comprising a worm 51 and a worm wheel 52, and has a coupling section 53 to couple the worm reduction mechanism to the output shaft 21. The worm 51 is formed in a middle portion of the worm shaft 51A being concentrically arranged in the output shaft 21 and is engaged with the worm wheel 52. The upper-side (handle) output shaft 2A of the column shaft 2 which integrally rotates with the worm wheel 52, is coupled to the concentric center of the worm wheel 52. The rotation of the motor 20, that is the rotation of the output shaft 21, is reduced and is transmitted to the upper-side output shaft 2A via the worm reduction mechanism.

An inside space of the motor attaching section 54 of the reduction mechanism side has a horn shape which gradually becomes a large diameter toward the motor 20 side (the opening side). Since the motor attaching section 54 is fixed to the motor attaching section 24 of the motor 20 side via a bolt, the opening of the motor attaching section 54 is sealed. The coupling section 53 and the output shaft 21 are positioned to a concentric center of the inside space of the motor attaching section 54 in a state that the motor 20 is attached to the motor attaching section 54 as shown in FIG. 2. The motor attaching section 54 is also in a corresponding flange form in a case that the motor attaching section 24 is in a flange form.

The motor 20 and the control unit (ECU) 30 or an ECU board are wired with a space via a lead wire 31, and the motor 20 is driving-controlled by the control unit (ECU) 30 via the lead wire 31.

In such the electric power steering apparatus, it is known the constitution that electric conductive parts such as a wiring board or bus bars are disposed near the coil of the motor, and the motor coil is electrically connected to an external power supply via the above parts.

Japanese Unexamined Patent Application Publication No. 2013-90376 A (Patent Document 1) is disclosed as a patent of the prior art. The constitution of Patent Document 1 is that: the control board is disposed at the anti-load side of the motor, a hole is necessarily existed in the motor case for disposing the bus bars, and the bus bars are protruded to the anti-load side.

THE LIST OF PRIOR ART DOCUMENTS

Patent Documents

Patent Document 1: Japanese Unexamined Patent Application Publication No. 2013-90376 A

SUMMARY OF THE INVENTION

Problems to be Solved by the Invention

However, no description exists the through holes for the bus bars in the motor of Patent Document 1. If the through holes are disposed in one direction when the terminals are pulled-out from a case bottom, a strain occurs on the case steel plate since a force does not evenly apply in a press process. This strain is affected to the accuracy of concentric degree, inclination or the like of a bearing house of the motor. Deterioration in the concentric degree of the bearing house of the motor or the concentric degree of the shaft makes a rattling occur in the EPS motor, and this is significantly contribute to a performance such as a stress and a noise.

The present invention has been developed in view of the above-described circumstances, and an object of the present invention is to provide a motor, and an electric power steering apparatus and a vehicle equipped with the above motor. The motor has a configuration that is provided with plural openings which are disposed at the same interval with a similar shape in a circumferential direction on a case bottom surface at an anti-load side of the motor, is protruded bus bars (bus bar terminals) from the openings, and is directly wired between control board and the bus bars by using a simple procedure.

Means for Solving the Problems

The present invention relates to a motor that an outer periphery is enclosed in a case and wirings are implemented at an anti-load side, and the above described object of the present invention is accomplished by a configuration that includes plural openings which are provided in a circumferential direction on a case bottom surface at the anti-load side and allow bus bar terminals to protrude therefrom, and openings which have an almost same shape of the plural openings and are disposed at a predetermined interval in a similar shape are added as needed.

The above described object of the present invention is effectively accomplished by that: wherein the predetermined interval is a same interval; or wherein the bus bars are connected to dual-system motor windings; or wherein bus bar positions of the dual-system motor windings are almost arranged in diagonal positions with respect to a center; or wherein bus bar positions of the dual-system motor windings are adjacent arrangements; or wherein at least two openings from which the bus bars do not protrude, are utilized as threaded holes to fix a resolver stator; or wherein taps (burring taps) are formed on the case bottom surface, and a case of the resolver stator is fixed to the taps with screws; or wherein an insulating cap or an insulating film to cover the case is provided to insulate between the case and the bus bars.

An electric power steering apparatus, which is driving-controlled by the above motor, and applies an assist force by means of a current command value calculated based on at least a steering torque to a steering system of the vehicle, and a vehicle equipped with the above electric power steering apparatus, are achieved.

Effects of the Invention

According to the motor of the present invention, because a configuration that the plural openings are disposed in a circumferential direction on the case bottom surface at the anti-load side, and the bus bar terminals (the bus bars) are protruded from the openings, it is possible to easily connect the bus bars to the control board and so on and to omit the surplus wirings.

The openings which do not protrude the bus bars can utilize to fix a rotational position sensor such as the resolver, and realize a simple configuration that the motor and the rotational position sensor are integrated.

The electric power steering apparatus with a high position precision, a reasonable cost, and a high reliability by applying the above motor to the electric power steering apparatus is accomplished. More stability and a reduction in cost of the vehicle can be achieved by equipped the vehicle with the electric power steering apparatus.

MODE FOR CARRYING OUT THE INVENTION

Figure 1:
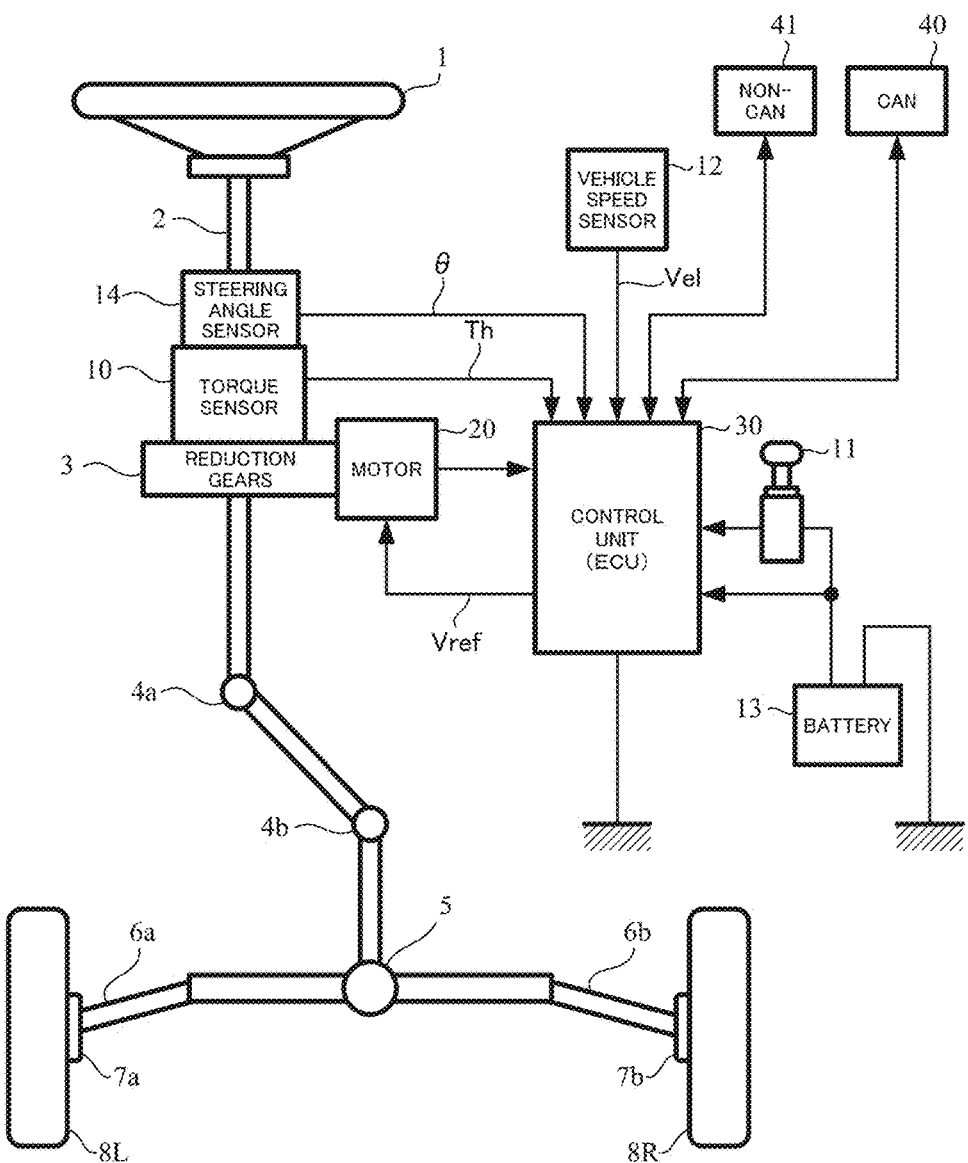
FIG. 1 is a configuration diagram illustrating a general outline of an electric power steering apparatus.
Figure 2:
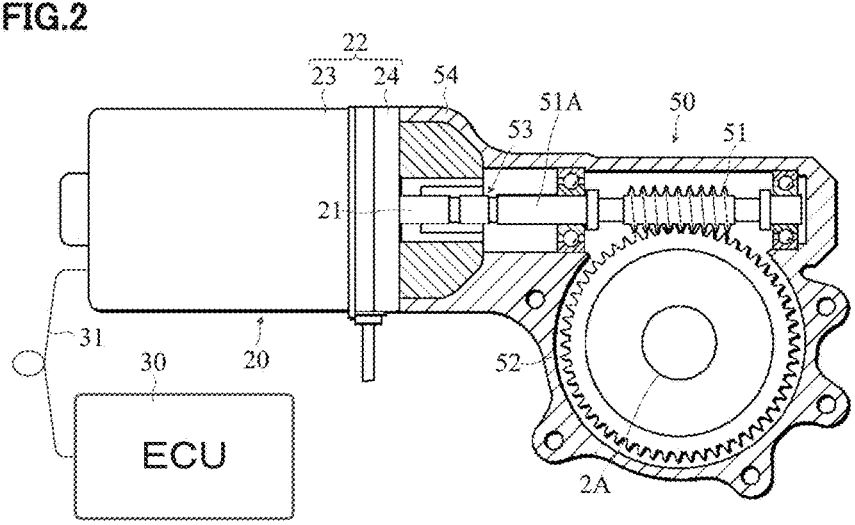
FIG. 2 is a diagram showing a coupling mechanism example of a motor of the electric power steering apparatus and a reduction section, and a connection example of the motor and a control unit (ECU)

An outer periphery of a motor according to the present invention is covered with a steel plate case. A wiring process and an assembling process of a configuration that wirings are performed by pulled-out bus bars to an anti-load side (an opposite side of an output shaft), are considered in the motor.

In a case of disposing a control board to the anti-load side in the present invention, it has an effect that suppresses strain which is affected to a concentric degree of a bearing house in a process by disposing a plurality of similar holes in a circumferential direction at the same interval on the case bottom surface when the bus bars are penetrated by providing holes on the case. The plural holes can use not only to pull-out the bus bars which increase by using dual-system windings, but also to fix a resolver stator via screws. In order to need to keep insulating between wiring terminals and the bus bars connecting section and between the bus bars and the case, a cap-shape insulating resin so as to cover the bus bars is provided between a yoke and the bus bars. Alternatively, an insulating film is wound to the bus bars so as to cover the bus bars. Further, in a case of using the insulating cap, screw holes to fix the resolver stator can be disposed by provided taps on the insulating cap.

The resolver stator may be directly fixed to the case by provided the taps on the case. When screw engagement allowance is not adequate in case of thin steel plate case or the like and a fixed force is inadequate, a countermeasure such as providing burring taps is performed. In this way, a similar effect is obtained.

In the motor of the present invention, the motor has a configuration that the plural openings are disposed at the same interval with a similar shape in a circumferential direction on a case bottom surface at the anti-load side, and the motor bus bars are protruded from the openings and are wiring-connected to bus terminals of an ECU side. By symmetrically disposing the openings opposed to the steel plate case, the strain in a press punching processing is minimized, a freedom of the wiring layout is existed as well as a concentric degree to the motor is kept. When dual-system motor windings are used in order to improve a redundancy of the motor, the bus bars increase to three-phase six-wires. However, the countermeasure can sequentially be performed by disposing the openings at the same interval with a similar shape. Further, the openings which do not use to protrude the bus bars can be also used to fix the resolver stator via the screws.

In addition, in order to insulate between the case and the bus bars, the insulating cap or the insulating film is provided. In the case of the insulating cap, a fixing mechanism of a rotational position sensor such as the resolver can be constructed by providing the taps on the case bottom surface.

The motor structure of the present invention has been established in itself to the utmost. Since the case covers the motor bottom surface and the wirings are pulled-out to the anti-load side via the bus bars, the openings to protrude the bus bars can be disposed at the same interval with a similar shape in a circumferential direction on the case bottom surface, and the wirings can use short wirings in a case of disposing the control board to the anti-load side. Further, in order to maintain the accuracy of the concentric degree to the motor shaft in the press punching process, holes are made by 90 degree equally spaced (the shape of the openings, the same interval, and the similar shape). The plural openings are also used as the holes for passing through the screws to fix the resolver stator or the holes for fixing via the screws, except for the holes for pulling-out the bus bars which increase by using the dual-system windings.

In the motor structure of the present invention, it is necessary to keep the insulating between winding terminals and the bus bars connecting section and between the bus bars and the case. Therefore, the insulating cap which is composed of the insulating resin is disposed between the case and the bus bars, or the insulating film is wound or layered to cover the bus bars. Consequently, it is possible to insulate between the case and the bus bar and between the case and the windings, and it is possible that the windings are surely pulled-out to the anti-load side of the motor. Further, in the case of using the insulating cap, the threaded holes to fix the resolver stator are provided on the insulating cap by engraving the taps on the surface of the insulating cap. The resolver stator is directly fixed to the insulating cap via the screws.

Hereinafter, embodiments of the present invention will be described with reference to the drawings. In the present embodiments, an example of the openings applied to the bus bars of three-phase dual-system windings is described, and it is possible to be applied to another motor types. The number of the openings, the shape of the openings, and the arrangement of the openings are appropriately changeable.

Figure 3:
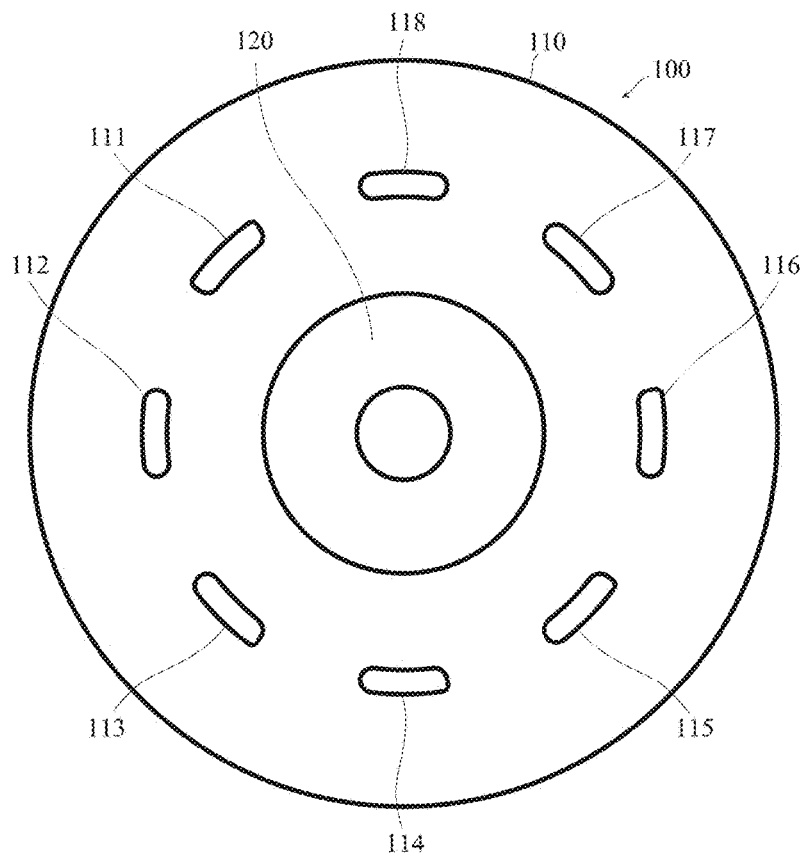
FIG. 3 is a plan view showing an example of a case bottom surface of an anti-load side.
Figure 4:
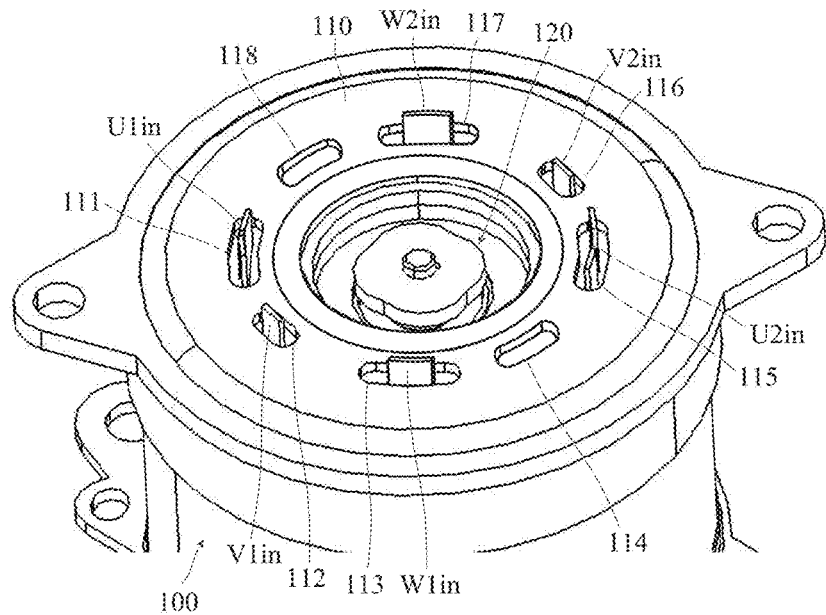
FIG. 4 is a perspective view showing a structure example of the motor according to the present invention.

FIG. 3 is a plan view of the case bottom surface 110 of the motor 100 according to the present invention, and FIG. 4 is a perspective view of the motor 100 according to the present invention. Eight rectangular openings 111 to 118 in the circumferential direction at the same interval are disposed on the case bottom surface 110 at the anti-load side by a press punching process or the like. Bus bars U1in, V1in, and W1in of a first system of the motor windings are protruded and pulled-out from the openings 111, 112, and 113, respectively. Bus bars U2in, V2in, and W2in of a second system of the motor windings are protruded and pulled-out from the openings 115, 116, and 117, respectively. The bus bars U1in, V1in, and W1in are a first coil of the bus bars of the dual-system winding motor, and the bus bars U2in, V2in, and W2in are a second coil of the bus bars of the dual-system winding motor. The bus bars U1in to W1in and the bus bars U2in to W2in are not contacted with the openings 111 to 113 and the openings 115 to 117 of the yoke 110, respectively.

In the center portion of the case bottom surface 110, a cylindrical recess 120 is provided. The case which is provided with the recess 120 forms the case bottom surface 110. The dual-system bus bars U1in to W1in and U2in to W2in which are protruded from the openings 111 to 113 and 115 to 117 are wiring-connected to bus terminals of the ECU side.

In FIGS. 3 and 4, although the openings 111 to 118 are the same shape, they may be the similar shape. Both ends of the openings 111 to 118 shown in FIGS. 3 and 4 respectively have round shapes. However, the round shapes may not be existed, and the shapes of the openings may be square or rectangular which is not contacted with the bus bars.

Figure 5:
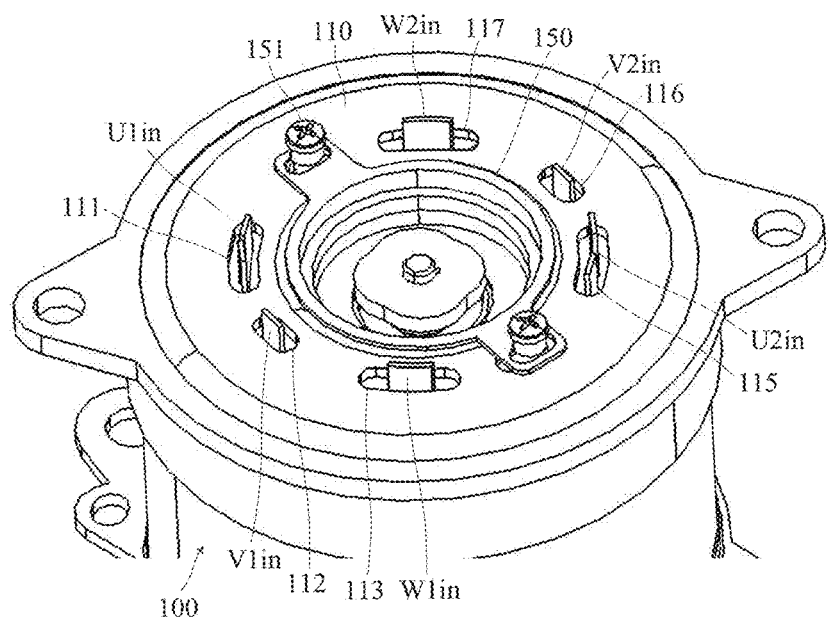
FIG. 5 is a perspective view showing a structure example (attaching a resolver stator) of the motor according to the present invention.
Figure 6:
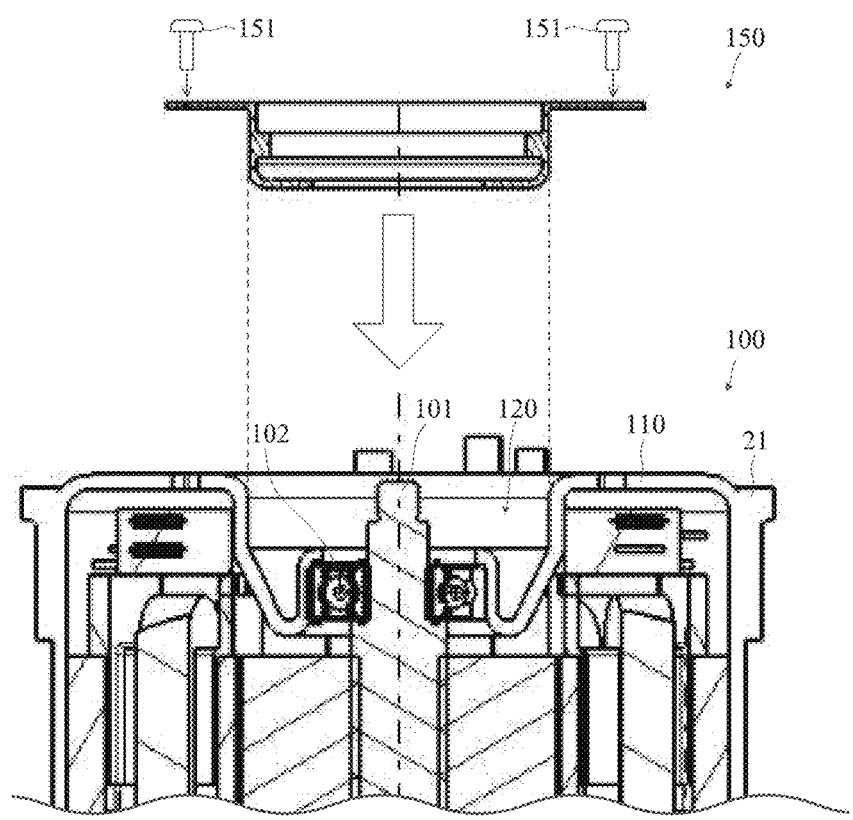
FIG. 6 is an assembling elevation view of the motor according to the present invention, showing a state of attaching the resolver stator.

In the case that the motor 100 is a brushless motor, it is required to detect a rotational position. Accordingly, as shown in FIGS. 5 and 6, the resolver stator 150 is inserted into the recess 120, and the resolver stator 150 is fastened and fixed to the motor 100 via the screws 151. At this time, unused openings 114 and 118 are used as fixing threaded holes. In FIG. 6, the rotor shaft 101 is protruded and a bearing 102 are provided in the recess 120.

Next, the motor which has the dual-system windings is described as follows.

Figure 7:
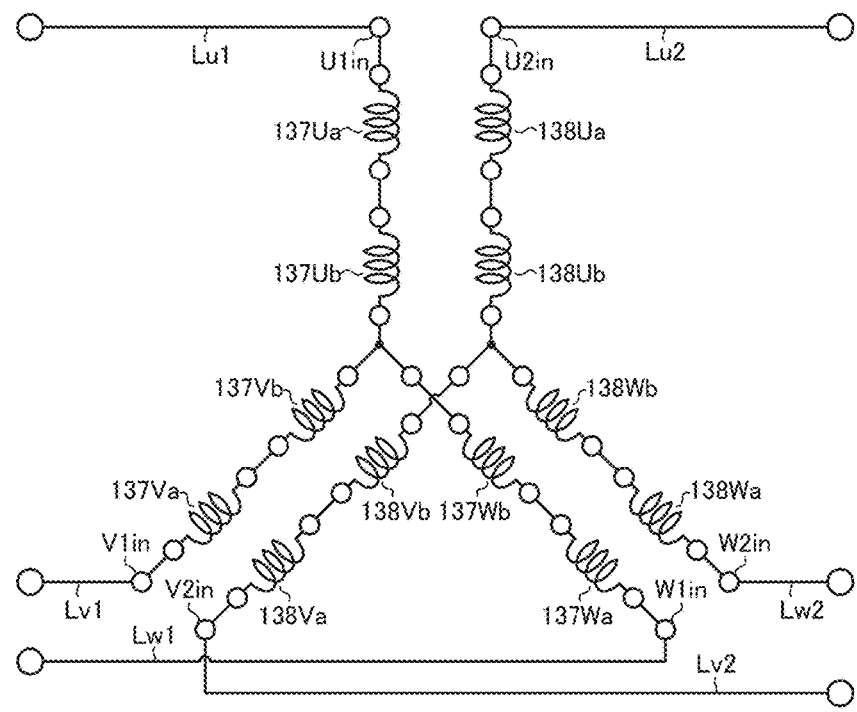
FIG. 7 is a wiring diagram of dual-system windings of the motor.

In the motor with the dual-system windings, the coils of the stator are divided into two systems (U1 to W1 phases and U2 to W2 phases). When one system of the motor fails to operate, the other system can rotate a rotor, and the motor windings are shown in FIG. 7. That is, six first coils include two first U-phase coils 137Ua and 137Ub which are excited by a current of the first U-phase, two first V-phase coils 137Va and 137Vb which are excited by a current of the first V-phase, and two first W-phase coils 137Wa and 137Wb which are excited by a current of the first W-phase. The first U-phase coil 137Ub is connected in series to the first U-phase coil 137Ua, the first V-phase coil 137Vb is connected in series to the first V-phase coil 137Va, and the first W-phase coil 137Wb is connected in series to the first W-phase coil 137Wa. Winding directions to teeth of the first coils are the same direction, and wirings Lu1, Lv1, and Lw1 are connected by Y-connection (star connection) via the bus bars U1in, V1in, and W1in.

Similarly, six second coils include two second U-phase coils 138Ua and 138Ub which are excited by a current of the second U-phase, two second V-phase coils 138Va and 138Vb which are excited by a current of the second V-phase, and two second W-phase coils 138Wa and 138Wb which are excited by a current of the second W-phase. The second U-phase coil 138Ub is connected in series to the second U-phase coil 138Ua, the second V-phase coil 138Vb is connected in series to the second V-phase coil 138Va, and the second W-phase coil 137Wb is connected in series to the second W-phase coil 137Wa. Winding directions to teeth of the second coils are the same direction, and wirings Lu2, Lv2, and Lw2 are connected by Y-connection (star connection) via the bus bars U2in, V2in, and W2in.

Figure 8:
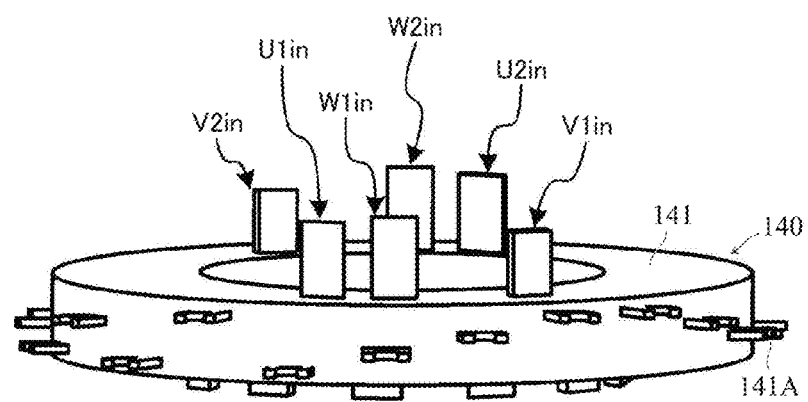
FIG. 8 is an exploded schematic perspective view showing a bus bar structure and a motor stator.
Figure 8:
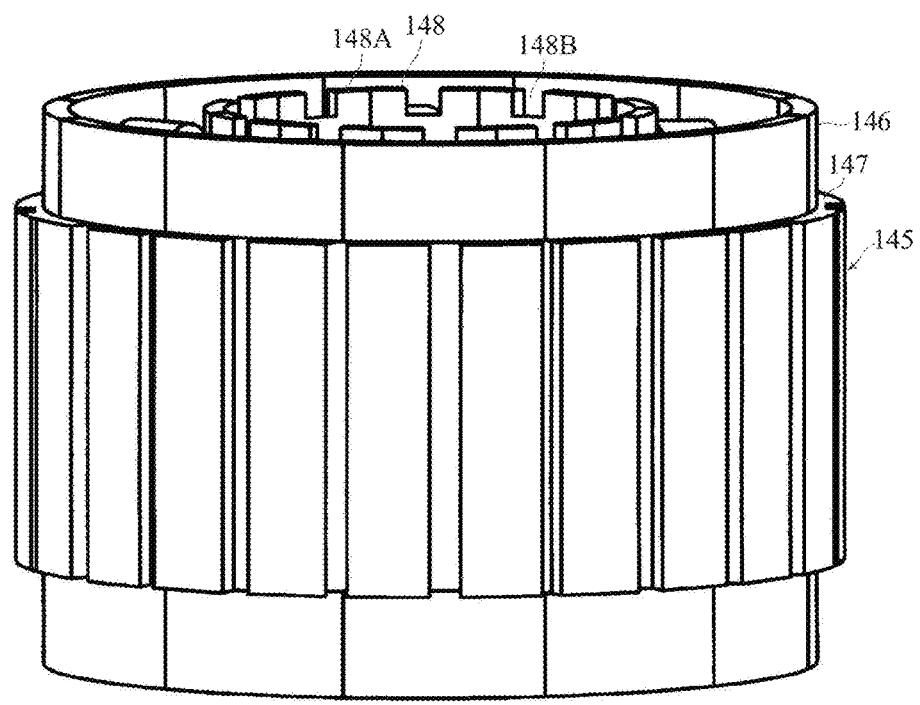
Figure 9:
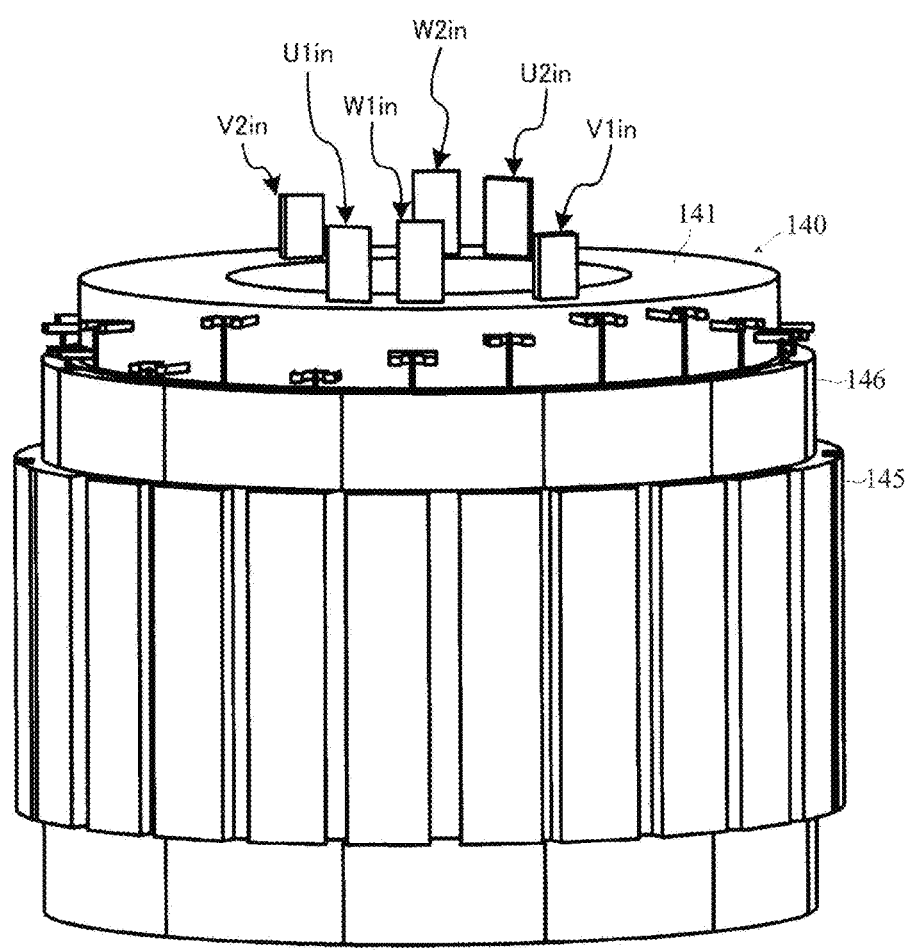
FIG. 9 is an external structure diagram explaining an assembling state of the bus bar structure and the motor stator.

FIG. 8 is an exploded schematic perspective view showing a bus bar structure 140 that the bus bars U1in, V1in, W1in, U2in, V2in, and W2in stand in perpendicular and a motor stator 145. FIG. 9 is a diagram explaining an assembling state of the bus bar structure 140 and the motor stator 145. As shown in FIG. 8, the bus bar structure 140 makes the bus bars U1in, V1in, W1in and U2in, V2in, W2in protrude upward for each three-phase input from one surface in an axial direction of a plate-type insulating member 141.

The bus bar structure 140 is provided at one side of the motor stator 145, and is opposed to an axial end 148 inside of an outer periphery 147 of an insulator 146. Plural protrusions 148A are provided on the axial end 148 in the circumferential direction, and the axial end 148 has a plurality of notches 148B which are cutouts being pinched with the neighbor on protrusions 148A. The bus bar structure 140 is fixed and positioned shown in FIG. 9 by putting the protrusions 141A in the notches 148B.

The above bus bars of the dual-system windings U1in, V1in, and W1in, and U2in, V2in, and W2in are protruded upward not so as to be contacted with the openings 111 to 113 and 115 to 117 which are disposed on the case bottom surface 110. Accordingly, it is necessary that the sizes of the openings 111 to 113 and 115 to 117 are larger than those of the bus bars U1in, V1in, and W1in, and U2in, V2in, and W2in for having a margin.

Figure 10:
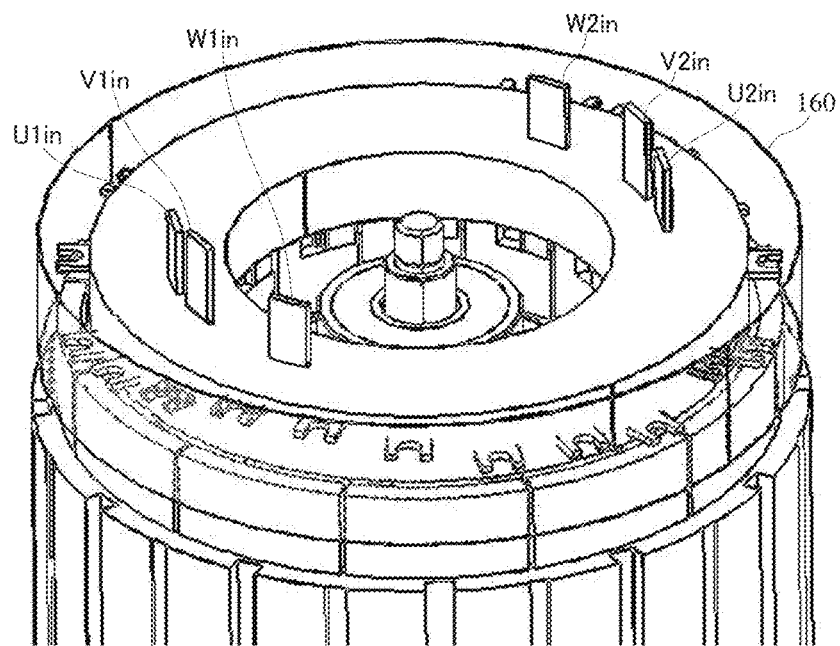
FIG. 10 is a perspective view showing a structure example of the motor of which a yoke is covered with an insulating film.
Figure 11:
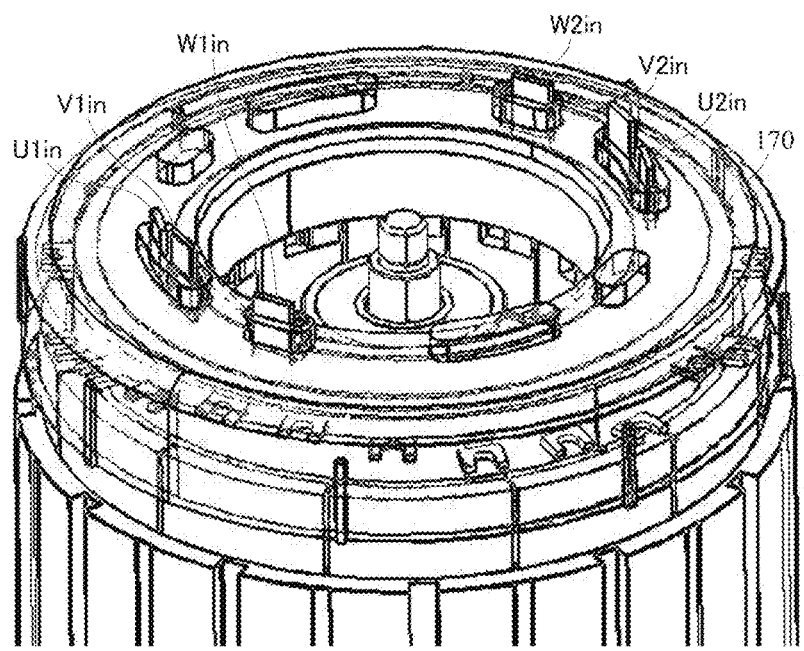
FIG. 11 is a perspective view showing a structure example of the motor of which the yoke is covered with an insulating cap.

In order to surely insulate between the bus bars U1in, V1in, and W1in, and U2in, V2in, and W2in and the yoke 110 such that the bus bars are not contact with the yoke 110, an insulating film 160 is wound or layered as shown in FIG. 10, or an insulating cap 170 which is composed of the insulating resin with a cap shape is disposed as shown in FIG. 11. In order to insulate between the case openings and the bus bars, in case of the insulating film 160, the insulating film is wound to the bus bar pull-out portion and in case of the insulating cap 170, the protrusions of the bus bars are also covered with the insulating cap.

As well, in the case of the insulating cap 170, the threaded holes to fix the resolver stator can be provided by engraving the taps on the surfaces of the insulating cap 170.

EXPLANATION OF REFERENCE NUMERALS 1 handle
2 column shaft (steering shaft, handle shaft)
10 torque sensor
12 vehicle speed sensor
14 steering angle sensor
20 motor
21 output shaft
30 control unit (ECU)
40 CAN
100 motor (brushless motor)
110 case bottom surface
111~118 opening
120 recess
140 bus bar structure
145 motor stator
150 resolver stator
160 insulating film
170 insulating cap

The invention claimed is:

1. A motor that an outer periphery is enclosed in a case and wirings are implemented at an anti-load side, comprising:
    a configuration in which plural openings having an elliptical shape are provided in a circumferential direction on a case bottom surface at said anti-load side in a same interval,
    a part of said plural openings having the elliptical shape are provided for protruding bus bars of motor windings and others of said plural openings having the elliptical shape are provided for being utilized as threaded holes,
    said plural openings having the elliptical shape are a similar shape and are not contacted with said bus bars,
    plural protrusions are provided in a circumferential direction on an axial end inside of an outer periphery of an insulator,
    said insulator comprises plural notch sections which are cutouts disposed between said neighbor protrusions,
    said motor comprises a bus bar structure which is provided at one side of a motor stator and is opposed to an axial end inside of an outer periphery of an insulator, and
    engagement sections, which are provided on a circumferential side surface of said bus bar structure, are engaged with said notch sections, and
    an insulating cap or an insulating film to cover said case is provided to insulate between said case and said bus bars.

2. The motor according to claim 1, wherein said motor windings are a dual-system and said bus bars are connected to said dual-system motor windings.

3. The motor according to claim 2, wherein bus bar positions of said dual-system motor windings are arranged in diagonal positions with respect to a center and said openings are provided corresponding to said arrangement of said bus bars.

4. The motor according to claim 3, wherein a cylindrical recess coupled to a rotational position detecting means is provided on a bottom surface of said case, a number for said openings is a number which is added at least two or more to a number for said bus bars, and said at least two or more openings which are not used for said bus bars are utilized as threaded holes.

5. The motor according to claim 2, wherein bus bar positions of said dual-system motor windings are sequentially arranged in an order of a system and said openings are provided corresponding to said arrangement of said bus bars.

6. The motor according to claim 5, wherein a cylindrical recess coupled to a rotational position detecting means is provided on a bottom surface of said case, a number for said openings is a number which is added at least two or more to a number for said bus bars, and said at least two or more openings which are not used for said bus bars are utilized as threaded holes.

7. The motor according to claim 2, wherein a cylindrical recess coupled to a rotational position detecting means is provided on a bottom surface of said case, a number for said openings is a number which is added at least two or more to a number for said bus bars, and said at least two or more openings which are not used for said bus bars are utilized as threaded holes.

8. The motor according to claim 1, wherein threaded holes for being fixed to a rotational position sensor are provided on said insulating cap by tapping thereon.

9. An electric power steering apparatus that is driving-controlled by said motor according to claim 1, and applies an assist force to a steering system of a vehicle by means of a current command value calculated based on at least a steering torque.

10. A vehicle which is equipped with said electric power steering apparatus according to claim 9.

\* \* \* \* \*